(12) United States Patent
Tsukahara

(10) Patent No.: US 10,112,453 B2
(45) Date of Patent: Oct. 30, 2018

(54) SHOCK ABSORBER

(71) Applicant: Showa Corporaiton, Gyoda-shi (JP)

(72) Inventor: Takashi Tsukahara, Gyoda (JP)

(73) Assignee: SHOWA CORPORATION, Gyoda-Shi (JP)

( * ) Notice: Subject to any disclaimer, the term of this patent is extended or adjusted under 35 U.S.C. 154(b) by 137 days.

(21) Appl. No.: 15/049,758

(22) Filed: Feb. 22, 2016

(65) Prior Publication Data

US 2016/0185176 A1 Jun. 30, 2016

(30) Foreign Application Priority Data

Dec. 26, 2014 (JP) .................................. 2014-266126

(51) Int. Cl.
*B60G 13/08* (2006.01)
*F16F 9/19* (2006.01)
*F16F 9/34* (2006.01)

(52) U.S. Cl.
CPC ................ *B60G 13/08* (2013.01); *F16F 9/19* (2013.01); *F16F 9/34* (2013.01); *B60G 2202/24* (2013.01); *B60G 2206/41* (2013.01)

(58) Field of Classification Search
CPC ............... B60G 13/08; B60G 2202/24; B60G 2206/41; B60G 2500/112; F16F 9/19; F16F 9/34
USPC .................. 188/322.15, 322.22, 322.13, 316
See application file for complete search history.

(56) References Cited

U.S. PATENT DOCUMENTS

| 4,854,429 A * | 8/1989 | Casey ..................... F16F 9/465 |
| | | 137/599.16 |
| 5,168,965 A * | 12/1992 | Huang ..................... F16F 9/46 |
| | | 188/282.2 |
| 2014/0048365 A1* | 2/2014 | Kim ......................... F16F 9/34 |
| | | 188/322.13 |

FOREIGN PATENT DOCUMENTS

| JP | 03-072131 U | 7/1991 |
| JP | 07-091476 A | 4/1995 |

OTHER PUBLICATIONS

Office Action dated May 22, 2018 for the corresponding Japanese Patent Application No. 2014-266126.

* cited by examiner

*Primary Examiner* — Xuan Lan Nguyen
(74) *Attorney, Agent, or Firm* — Leason Ellis LLP

(57) ABSTRACT

A hydraulic shock absorber includes: a cylinder that houses a liquid; a piston housing provided in the cylinder so as to be movable in an axial direction and partitions a space in the cylinder into a first oil chamber and a second oil chamber; a valve seat forming a channel for a liquid flowing across the first oil chamber and the second oil chamber in conjunction with movement of the piston housing; a damping valve that opens and closes a channel port of the channel in the valve seat to control a flow of the oil through the channel: a pressure chamber that houses the oil and that enables a pressure of the oil that has been housed to be changed; and a pressing portion that uses a pressure in the pressure chamber to press the damping valve in a direction in which the damping valve closes the channel port.

10 Claims, 10 Drawing Sheets

SHOCK ABSORBER

CROSS-REFERENCE TO RELATED APPLICATIONS

This application is based on and claims priority under 35 USC 119 from Japanese Patent Application No. 2014-266126 filed on Dec. 26, 2014, the entire content of which is incorporated herein by reference.

BACKGROUND OF THE INVENTION

1. Field of the Invention

The present invention relates to a shock absorber that performs damping using a liquid.

2. Description of the Related Art

A suspension apparatus in a vehicle such as an automobile includes a shock absorber with a damping force generating mechanism that appropriately damps vibration transmitted from a road surface to a vehicle body during traveling in order to improve riding comfort and operational stability. For example, Japanese Patent Application Laid-open No. H7-091476 discloses a damping-force-variable damper including a compression side damping valve that allows a damping force to be exerted, and a damping-force characteristic varying means for varying a set load for the compression side damping valve to enable an exerted-damping-force characteristic to be variably controlled.

In the shock absorber, when the damping force resulting from movement of a partitioning portion is enabled to be varied, an apparatus configuration is preferably simple.

An object of the present invention is to enable the damping force resulting from movement of the partitioning portion to be changed using a simple configuration.

SUMMARY OF THE INVENTION

An aspect of the present invention provides a shock absorber including: a cylinder that houses a liquid, a partitioning portion that is provided in the cylinder so as to be movable in an axial direction and partitions a space in the cylinder into a first liquid chamber and a second liquid chamber, a channel forming portion that forms a channel for a liquid flowing across the first liquid chamber and the second liquid chamber in conjunction with movement of the partitioning portion; a valve that opens and closes a channel port of the channel in the channel forming portion to control a flow of the liquid through the channel; a pressure chamber that houses the liquid and that enables a pressure of the housed liquid to be changed; and a pressing portion that uses a pressure in the pressure chamber to press the valve in a direction in which the valve closes the channel port.

In this configuration, the pressure in the pressure chamber is changed to enable a change in a damping force resulting from movement of the partitioning portion. Thus, an apparatus configuration can be simplified.

In the aspect of the present invention, the damping force resulting from movement of the partitioning portion can be changed using a simple configuration.

DETAILED DESCRIPTION OF THE INVENTION

Embodiments of the present invention will be described below with reference to the attached drawings.

Embodiment 1

Figure 1:
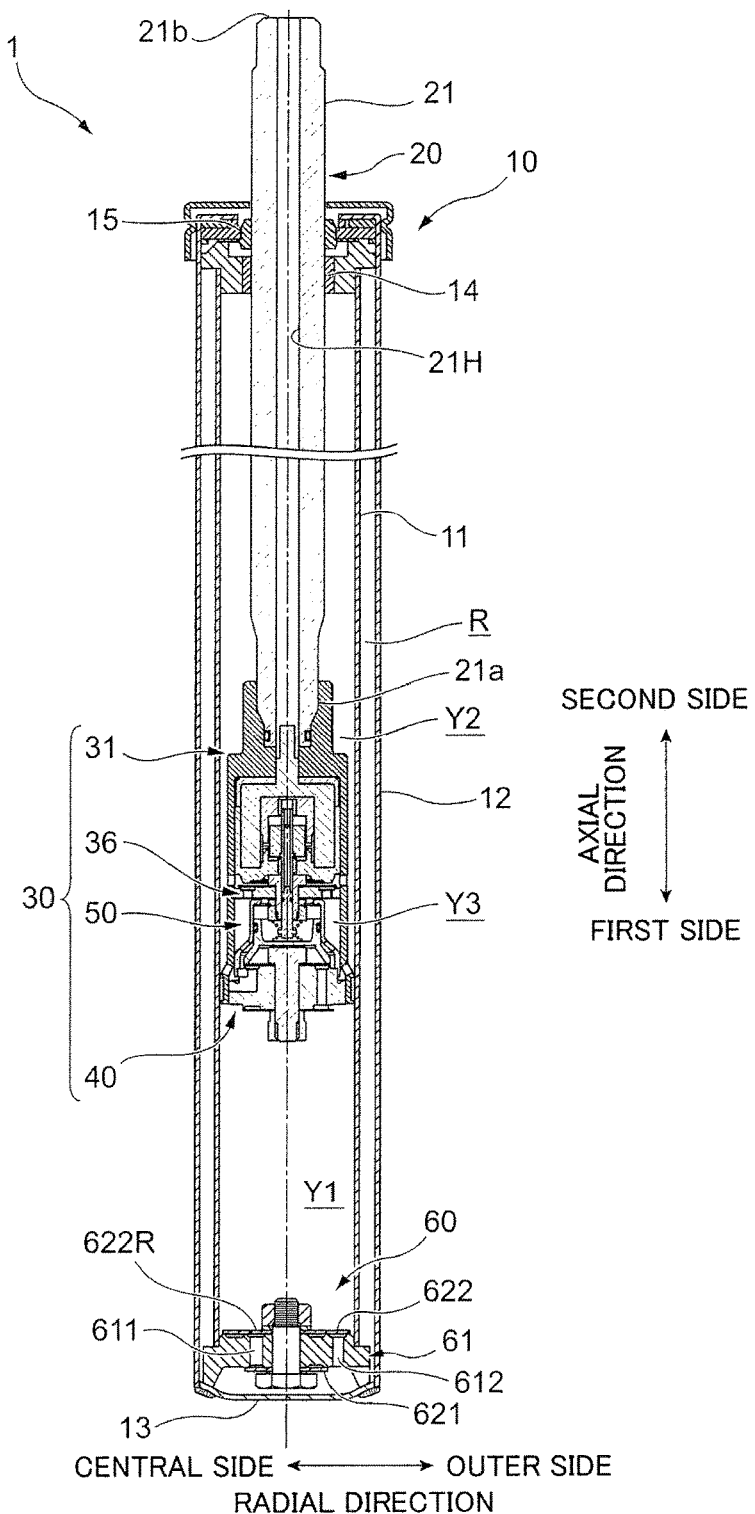
FIG. 1 is a diagram of a general configuration of a hydraulic shock absorber in Embodiment 1.

FIG. 1 is a diagram of a general configuration of a hydraulic shock absorber 1.

In FIG. 1, a lower side in an axial direction of a hydraulic shock absorber 1 is hereinafter referred to as a "first side", and an upper side in the axial direction is hereinafter referred to as a "second side". A center of the hydraulic shock absorber 1 in a radial direction thereof is hereinafter referred to as a "central side", and an outer side of the hydraulic shock absorber 1 in the radial direction is hereinafter simply referred to as "outer side".

<Configuration and Functions of the Hydraulic Shock Absorber 1>

As depicted in FIG. 1, the hydraulic shock absorber 1 (shock absorber) includes a cylinder portion 10, a rod portion 20 that protrudes, on a second side thereof, to the exterior of the cylinder portion 10 and that is, on a first side thereof, slidably inserted into the cylinder portion 10, a piston portion 30 provided at a first-side end of the rod portion 20, and a bottom valve portion 60 arranged at a first-side end of the cylinder portion 10.

The hydraulic shock absorber 1 is provided between a vehicle body and an axle in, for example, a four-wheeled vehicle or a two-wheeled vehicle to damp amplitude motion of the rod portion 20 with respect to the cylinder portion 10.

The cylinder portion 10 includes a cylinder 11, a second cylinder 12 provided outside the cylinder 11, and a bottom portion 13 provided at a first-side end of the second cylinder 12. In the present embodiment, a reservoir chamber R (liquid reservoir chamber) in which oil is stored is formed between the cylinder 11 and the second cylinder 12.

The cylinder portion 10 has a rod guide 14 provided at a second-side end of the cylinder 11 and a seal member 15 that closes a second-side end of the second cylinder 12.

In the present embodiment, the rod portion 20 has a rod member 21 formed to extend in the axial direction, a first-side attachment portion 21a provided at a first-side end of the rod member 21, and a second-side attachment portion 21b provided at a second-side end of the rod member 21. The rod member 21 has a through-hole 21H that penetrates the interior of the rod member 21 in the axial direction.

The first-side attachment portion 21a of the rod member 21 holds the piston portion 30. A coupling member (not depicted in the drawings) is attached to the second-side attachment portion 21b of the rod member 21 and used to couple the hydraulic shock absorber 1 to, for example, a vehicle body of an automobile. The through-hole 21H forms a space through which a cable (not depicted in the drawings) electrically connected to a solenoid mechanism portion 59 described below is passed.

The piston portion 30 has a housing 31 (partitioning portion), an intermediate-chamber forming portion 36 provided in a central portion of the housing 31 in the axial direction, a damping unit 40 provided inside the housing 31 on the first side thereof and a damping-force adjusting portion 50 provided inside the housing 31 on the second side of the damping unit 40.

In the present embodiment, the housing 31 of the piston portion 30 is partitioned into a first oil chamber Y1 and a second oil chamber Y2 in which oil in a space in the cylinder 11 is housed. In the present embodiment, the first oil chamber Y1 is formed on the first side of the housing 31. The second oil chamber Y2 is formed on the second side of the housing 31.

Configurations of the piston portion 30, the damping unit 40, and the damping-force adjusting portion 50 will be described below in detail.

The bottom valve portion 60 includes a valve body 61 having a plurality of compression side oil paths 611 penetrating the bottom valve portion 60 in the axial direction and a plurality of extension side oil paths 612 located outside the compression side oil paths 611 in the radial direction and penetrating the bottom valve portion 60 in the axial direction, a compression side valve 621 provided on the first side of the valve body 61, and an extension side valve 622 provided on the second side of the valve body 61. The extension side valve 622 has oil holes 622R at positions corresponding to the compression side oil paths 611 in the radial direction.

The bottom valve portion 60 is provided at a first-side end of the hydraulic shock absorber 1 to partition the first oil chamber Y1 from the reservoir chamber R.

A general configuration of the hydraulic shock absorber 1 according to the present embodiment will be described.

As depicted in FIG. 1, the hydraulic shock absorber 1 (shock absorber) in Embodiment 1 includes the cylinder 11 that houses oil (liquid), the housing 31 (partitioning portion) provided in the cylinder 11 so as to be movable in the axial direction and that partitions the space in the cylinder 11 into the first oil chamber Y1 (first liquid chamber) and the second oil chamber Y2 (second liquid chamber), a valve seat 41 (channel forming portion) described below and forming a channel for oil flowing across the first oil chamber Y1 and the second oil chamber Y2 in conjunction with movement of the housing 31, a damping valve 43 (valve) described below and opening and closing a channel portion of the channel in the valve seat 41 to control the flow of the oil through the channel, a pressure chamber 50C described below and housing oil and enabling a change in the pressure of the housed oil, and a pressing portion 51 described below and using the pressure in the pressure chamber 50C to press the damping valve 43 in a direction where the damping valve 43 closes the channel port.

Configurations of these components will be described below in detail.

[Configuration and Functions of the Piston Portion 30]

Figure 2:
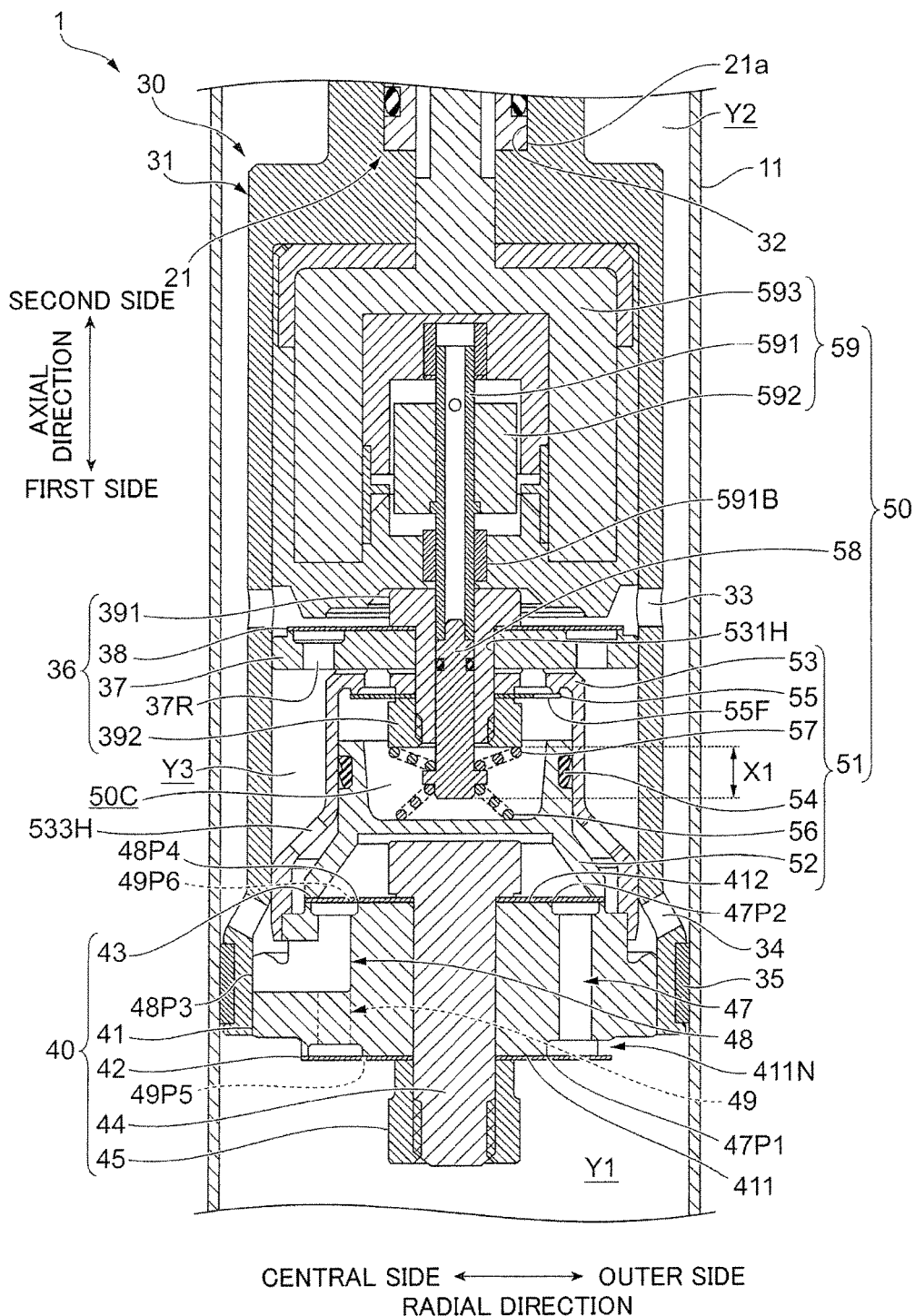
FIG. 2 is a sectional view of a piston portion in Embodiment 1.

FIG. 2 is a sectional view of the piston portion 30 in Embodiment 1.

Figure 3:
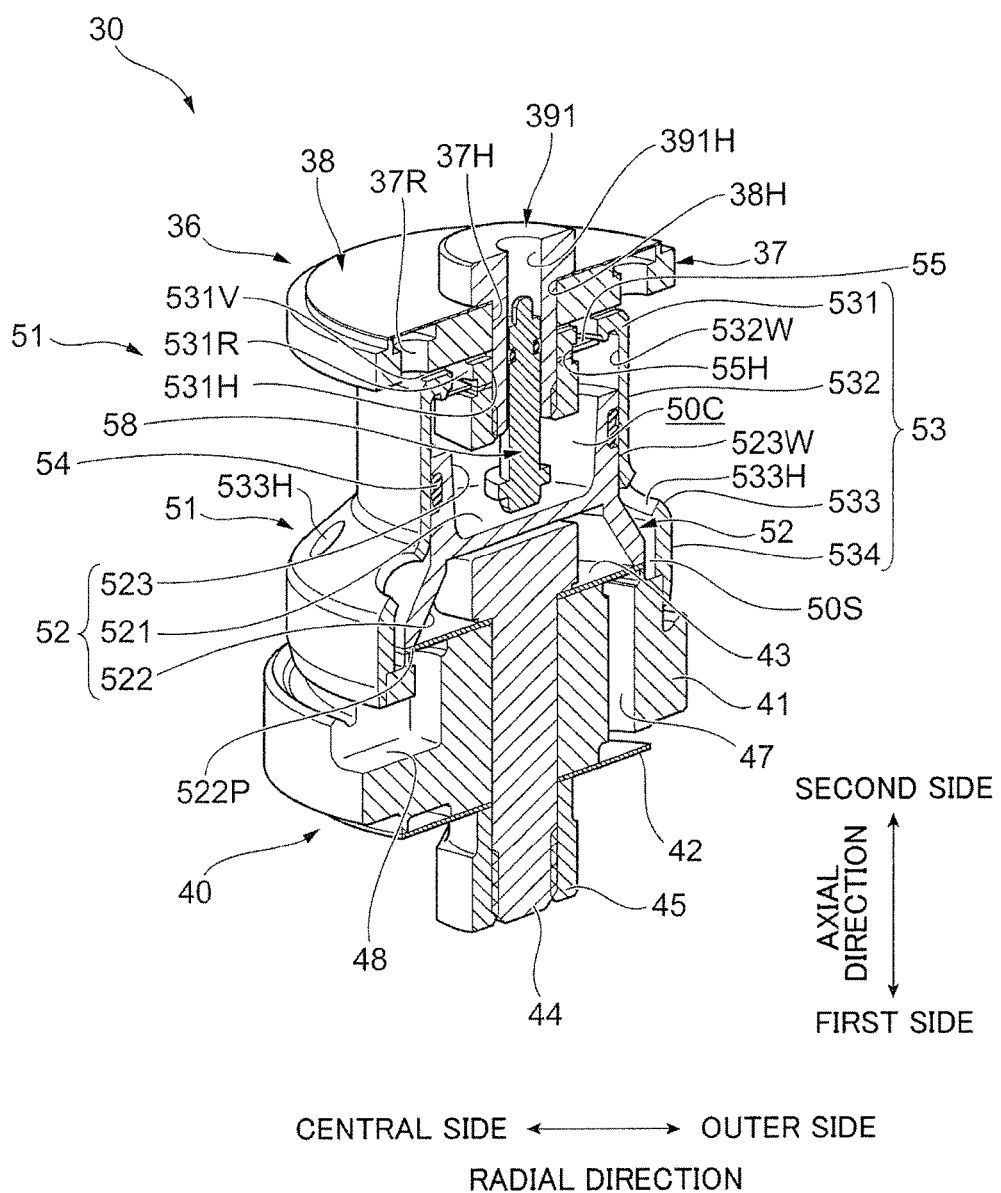
FIG. 3 is a perspective sectional view of an intermediate-chamber forming portion, a damping unit, and a damping-force adjusting portion in Embodiment 1.

FIG. 3 is a perspective sectional view of the intermediate-chamber forming portion 36, the damping unit 40, and the damping-force adjusting portion 50 in Embodiment 1.

Figure 4:
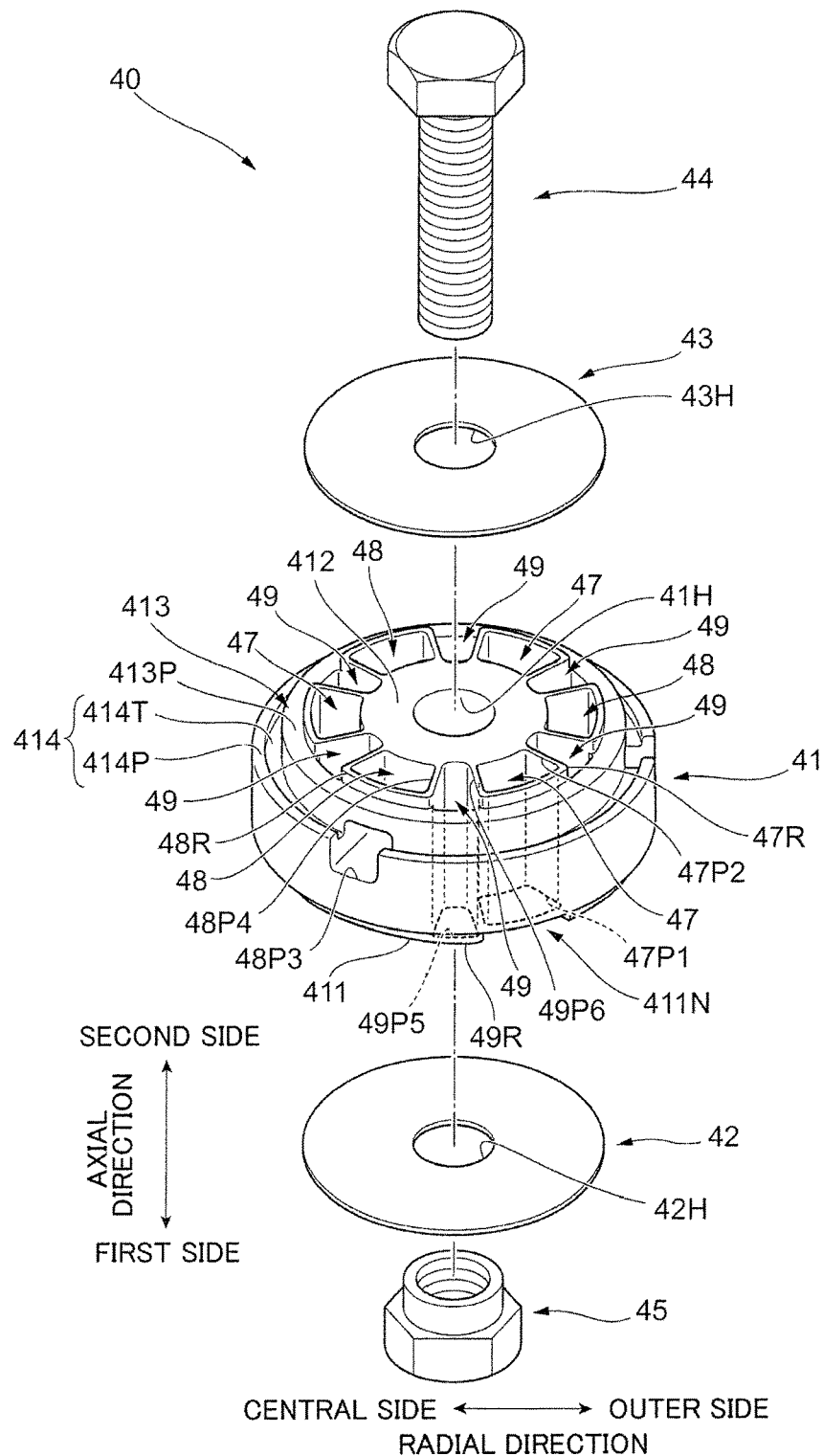
FIG. 4 is an exploded perspective view of the damping unit in Embodiment 1.

FIG. 4 is an exploded perspective view of the damping unit 40 in Embodiment 1. FIG. 4 is a diagram of the damping unit 40 as viewed from the second side.

[Housing 31]

As depicted in FIG. 2, the housing 31 is a hollow member that is open on the first side thereof and that is closed on the second side thereof. The housing 31 includes a connection portion 32 provided at a second-side end of the housing 31 on a central side of the housing 31 in the radial direction, a first housing oil path 33 arranged in a central portion of the housing 31 in the axial direction, a second housing oil path 34 provided on the first side of the housing 31, and a piston ring 35 provided on the first side of the housing 31 on an outer side of the housing 31 in the radial direction.

The connection portion 32 is a portion of the housing 31 that penetrates the housing 31 in the axial direction. The first-side end of the rod portion 20 is inserted into the connection portion 32. The connection portion 32 is fixed to the first-side attachment portion 21a of the rod member 21.

A plurality of (in the present embodiment, for example, eight) first housing oil paths 33 is formed in a circumferential direction. The first housing oil paths 33 bridge the second oil chamber Y2 and the inside of the housing 31.

A plurality of (in the present embodiment, for example, eight) second housing oil paths 34 is formed in the circumferential direction. The second housing oil paths 34 bridge the second oil chamber Y2 and the inside of the housing 31.

The piston ring 35 is installed around an outer periphery of the housing 31. The piston ring 35 is provided in slidable contact with an inner peripheral surface of the cylinder 11. The piston ring 35 reduces frictional resistance offered between the piston ring 35 and the cylinder 11.

[Intermediate Chamber Forming Portion 36]

As depicted in FIG. 2, the intermediate-chamber forming portion 36 has a check valve seat 37, an intermediate check valve 38 provided on the second side of the check valve seat 37, a holding bolt 391 provided on a central side of the check valve seat 37 in the radial direction so as to extend in the axial direction, and a nut 392 provided on the first side of the holding bolt 391.

The check valve seat 37 is a member formed generally like a cylinder. As depicted in FIG. 3, the check valve seat 37 has an opening 37H formed in a central side of the check valve seat 37 in the radial direction and penetrating the check valve seat 37 in the axial direction. The holding bolt 391 is inserted into the opening 37H. As depicted in FIG. 2, in the present embodiment, the check valve seat 37 is press-fitted inside and fixed to the housing 31.

As depicted in FIG. 2, the check valve seat 37 has a plurality of (in the present embodiment, six) channels 37R outside the opening 37H (see FIG. 3) in the radial direction. The channels 37R can communicate with the intermediate oil chamber Y3 on the first side of the channels 37R and with the second oil chamber Y2 on the second side of the channels 37R.

As depicted in FIG. 3, the intermediate check valve 38 is a member shaped generally like a disc having a bolt hole 38H that is formed on a central side of the intermediate check valve 38 in the radial direction and through which the holding bolt 391 is inserted. The intermediate check valve 38 is pressed against the second side of the check valve seat 37. The intermediate check valve 38 enables the channels 37R to be opened and closed.

As depicted in FIG. 2, the intermediate check valve 38, the check valve seat 37, a pressure chamber forming member 53 described below, and a pressure chamber check valve 55 described below are sandwiched between the holding bolt 391 and the nut 392. The holding bolt 391 and the nut 392 press the intermediate check valve 38 against the check valve seat 37. The holding bolt 391 and the nut 392 presses the pressure chamber check valve 55 against the pressure chamber forming member 53.

As depicted in FIG. 3, the holding bolt 391 has a through-hole 391H located on a central side of the holding bolt 391 in the radial direction and penetrating the holding bolt 391 in the axial direction. A plunger 591 and a shaft 58 described below are provided in the through-hole 391H so as to be movable in the axial direction.

[Damping Unit 40]

As depicted in FIG. 2, the damping unit 40 has the valve seat 41, a check valve 42 provided on the first side of the valve seat 41, the damping valve 43 provided on the second side of the valve seat 41, a fixation bolt 44 extending in the axial direction of the valve seat 41, and a nut 45 provided on the first side of the fixation bolt 44.

(Valve Seat 41)

As depicted in FIG. 4, the valve seat 41 is a member shaped generally like a cylinder. In the present embodiment, as depicted in FIG. 2, the valve seat 41 is press-fitted into and fixed to the housing 31.

As depicted in FIG. 4, the valve seat 41 has a first end surface 411 formed at a first-side end of the valve seat 41, a second end surface 412 formed at a second-side end, a first step portion 413 formed closer to a first-side end of the valve seat 41 than the second end surface 412, and a second step portion 414 formed closer to the first-side end of the valve seat 41 than the first step portion 413. The valve seat 41 has an opening 41H located on a central side of the valve seat 41 in the radial direction and penetrating the valve seat 41 in the axial direction. The valve seat 41 has a compression side oil path 47, a first extension side oil path 48, and a second extension side oil path 49 all located outside the opening 41H in the radial direction.

The first end surface 411 is a generally circular surface with the opening 41H on a central side of the surface in the radial direction. The first end surface 411 has a recessed portion 411N recessed with respect to the other portions of the first end surface 411. The second end surface 412 is a generally circular surface with the opening 41H on a central side of the surface.

The first step portion 413 includes a first annular portion 413P with a generally annular surface facing the second side. The second step portion 414 includes a second annular surface 414P with a generally annular surface facing the second side and an annular groove 414T formed on a central side of the second annular surface 414P in the radial direction. The annular groove 414T is an annular groove recessed toward the first side with respect to the second annular surface 414P.

As depicted in FIG. 4, the compression side oil path 47 extends in the axial direction so as to penetrate the valve seat 41 in the axial direction. A plurality of (in the present embodiment, three) the compression side oil paths 47 is provided. Each of the compression side oil paths 47 has a first oil path port 47P1 on the first side of the compression side oil path 47 and a second oil path port 47P2 on the second side of the compression side oil path 47. In the present embodiment, as depicted in FIG. 2, the first oil path port 47P1 faces the first oil chamber Y1. The second oil path port 47P2 faces the intermediate oil chamber Y3.

As depicted in FIG. 4, the first oil path port 47P1 is formed in a recessed portion 411N of the first end surface 411. In other words, the first oil path port 47P1 is formed at a lower projection height than the first end surface 411. A first round 47R is formed around the second oil path port 47P2 so as to enclose the second oil path port 47P2. The first round 47R has a projection height equal to the projection height of the second end surface 412 toward the second side in the axial direction.

The first extension side oil path 48 extends through the valve seat 41 in the axial direction and also extends in a radial direction of the valve seat 41. That is, the first extension side oil path 48 is generally L-shaped. A plurality of (in the present embodiment, three) the first extension side oil paths 48 is provided. Each of the first extension side oil paths 48 has a third oil path port 48P3 on the first side of the first extension side oil path 48 and a fourth oil path port 48P4 on a central side of the first extension side oil path 48 in the axial direction. In the present embodiment, as depicted in FIG. 2, the third oil path port 48P3 faces the second oil chamber Y2. The fourth oil path port 48P4 faces the intermediate oil chamber Y3.

As depicted in FIG. 4, the third oil path port 48P3 is formed to face in the radial direction. That is, the third oil path port 48P3 is formed in an outer peripheral portion of the valve seat 41. The third oil path port 48P3 is contiguous with parts of the second annular surface 414P and the annular groove 414T, which form the second step portion 414. A second round 48R is formed around the fourth oil path port 48P4 so as to enclose the fourth oil path port 48P4. The second round 48R has a projection height equal to the projection height of the second end surface 412 toward the second side in the axial direction.

The second extension side oil path 49 extends in the axial direction so as to penetrate the valve seat 41 in the axial direction. A plurality of (in the present embodiment, six) the second extension side oil paths 49 is provided. Each of the second extension side oil paths 49 has a fifth oil path port 49P5 on the first side thereof and a sixth oil path port 49P6 on the second side thereof. In the present embodiment, as depicted in FIG. 2, the fifth oil path port 49P5 faces the first oil chamber Y1. The sixth oil path port 49P6 faces the intermediate oil chamber Y3.

As depicted in FIG. 4, the fifth oil path port 49P5 is formed to be equal in height to the first end surface 411 toward the first side in the axial direction. The sixth oil path port 49P6 is formed such that a partial projection height of the sixth oil path port 49P6 on the central side in the radial direction is equal to projection height of the second end surface 412. Moreover, the sixth oil path port 49P6 is formed such that a partial projection height of the sixth oil path port 49P6 on the outer side in the radial direction is equal to the projection height of the first annular portion 413P.

In the valve seat 41 (channel forming portion) configured as described above, the compression side oil path 47 (first channel) allows for the flow, in a particular direction (in the present embodiment, the direction from the first side toward the second side along the axial direction), of oil flowing from the first oil chamber Y1 toward the second oil chamber Y2 in conjunction with movement of the housing 31 (partitioning portion) in one direction in the axial direction. The compression side oil path 47 thus allows the oil to flow out through the second oil path port 47P2 (first channel port) arranged at the end of the valve seat 41.

In the valve seat 41, the first extension side oil path 48 (second channel) allows for the flow, in the particular direction, of oil flowing from the second oil chamber Y2 toward the first oil chamber Y1 in conjunction with movement of the housing 31 (partitioning portion) in the other direction in the axial direction. The first extension side oil path 48 thus allows the oil to flow out through the fourth oil path port 48P4 (second channel port) arranged at the end of the valve seat 41.

As described below, the single damping valve 43 is used to control the flow of oil through the second oil path port 47P2 and the fourth oil path port 48P4, each arranged at the second-side end of the valve seat 41. In this manner, in the present embodiment, the flow of oil during an extension stroke and a compression stroke is controlled on one side of the valve seat 41 (in the present embodiment, on the second side), simplifying the apparatus.

(Check Valve 42)

As depicted in FIG. 4, the check valve 42 is a generally disc-shaped member having a bolt hole 42H located on a central side of the check valve 42 in the radial direction and through which the fixation bolt 44 is inserted. The check valve 42 is pressed against the first end surface 411 of the valve seat 41 and a third round 49R. Then, as depicted in FIG. 2, the check valve 42 enables the fifth oil path port 49P5 of the second extension side oil path 49 to be opened and closed. A part of the first oil path port 47P1 of the compression side oil path 47 is formed into a recessed portion 411N having a lower projection height than the first end surface 411. Therefore, the check valve 42 constantly opens the first oil path port 47P1.

(Damping Valve 43)

As depicted in FIG. 4, the damping valve 43 is a generally disc-shaped member having a bolt hole 43H located on a central side of the damping valve 43 in the radial direction and through which the fixation bolt 44 is inserted. The damping valve 43 is pressed against the second end surface 412 of the valve seat 41, the first round 47R, and the second round 48R. Then, as depicted in FIG. 2, the damping valve 43 enables the second oil path port 47P2 of the compression side oil path 47 and the fourth oil path port 48P4 of the first extension side oil paths 48 to be opened and closed. As depicted in FIG. 4, a part of the sixth oil path port 49P6 of the second extension side oil path 49 is formed to be equal in height to the first annular portion 413P having a lower projection height than the second end surface 412. Therefore, the damping valve 43 constantly opens the sixth oil path port 49P6.

(Fixation Bolt 44, Nut 45)

As depicted in FIG. 2, the check valve 42, the valve seat 41, and the damping valve 43 are sandwiched between the fixation bolt 44 and the nut 45. The fixation bolt 44 and the nut 45 press the check valve 42 and the damping valve 43, respectively, against the valve seat 41. The fixation bolt 44 and the nut 45 are prevented from pressing portions of the check valve 42 and the damping valve 43 faced by the oil path ports (the first oil path port 47P1 to the sixth oil path port 49P6) of the oil paths (the compression side oil path 47, the first extension side oil paths 48, and the second extension side oil path 49).

[Damping-Force Adjusting Portion 50]

As depicted in FIG. 2, the damping-force adjusting portion 50 includes the pressing portion 51, the shaft 58, and the solenoid mechanism portion 59.

(Pressing Portion 51)

The pressing portion 51 has a pressing member 52, the pressure chamber forming member 53, a seal member 54, a pressure chamber check valve 55, a first spring 56, and a second spring 57.

As depicted in FIG. 3, the pressing member 52 has a bottom portion 521, a large-diameter portion 522 on one side of the bottom portion 521, and a cylindrical portion 523 provided on the second side of the bottom portion 521.

The bottom portion 521 is a generally-disc-shaped portion provided on a central side of the pressing member 52 in the axial direction.

The large-diameter portion 522 is formed to have a bore diameter and an outside diameter increasing from the second side corresponding to a bottom portion 521 toward the first side. The large-diameter portion 522 has a generally-ring-shaped contact portion 522P at a first-side end thereof.

The cylindrical portion 523 is formed such that an outer peripheral surface 523W of the cylindrical portion 523 extends along the axial direction. The outer peripheral surface 523W faces an inner peripheral surface 532W described below of the pressure chamber forming member 53. The cylindrical portion 523 enables the pressure chamber forming member 53 to move in the axial direction. The area of a portion of the cylindrical portion 523 that faces the second side is larger than the surface area of a portion of the shaft 58 that faces the first side.

The pressure chamber forming member 53 has a channel portion 531 formed on the second side, a pressure-chamber first cylindrical portion 532 formed on the first side of the channel portion 531, a pressure-chamber large-diameter portion 533 formed on the first side of the pressure-chamber first cylindrical portion 532, and a pressure-chamber second cylindrical portion 534 formed on the first side of the pressure-chamber large-diameter portion 533.

The channel portion 531 is a generally-disc-shaped portion. The channel portion 531 has an opening 531H located on a central side of the channel portion 531 in the radial direction, a channel 531R formed outside the opening 531H in the radial direction, and a micro-channel 531V formed on the second side.

A holding bolt 391 penetrates the opening 531H. The channel 531R communicates with the pressure chamber 50C described below on the first side and communicates with the micro-channel 531V on the second side. The micro-channel 531V includes a groove located at a second-side end of the channel portion 531 and extending from a central side to an outer side of the second-side end in the radial direction. The micro-channel 531V forms a radial oil channel between the channel portion 531 and the check valve seat 37.

An inner peripheral surface 532W is formed on the pressure-chamber first cylindrical portion 532 along the axial direction. The inner peripheral surface 532W is faced by the outer peripheral surface 523W of the cylindrical portion 523. The pressure-chamber first cylindrical portion 532 of the pressure chamber forming member 53 forms the pressure chamber 50C along with the cylindrical portion 523 of the pressing member 52 (contact member). The pressure chamber 50C is filled with oil in the cylinder 11. The pressure chamber 50C is formed as a space that houses oil while being partitioned from the oil in the cylinder 11 and that enables a change in the pressure of the housed oil.

In the present embodiment, the area (pressure receiving area) of a portion of the pressing member 52 (contact member: the bottom portion 521 and the cylindrical portion 523) that contacts the oil in the pressure chamber 50C is set larger than the area (pressure receiving area) of a portion of the shaft 58 (advancing and retracting member) that similarly contacts the oil in the pressure chamber 50C.

The outside diameter of the pressure-chamber first cylindrical portion 532 (see FIG. 3) is set smaller than the bore diameter of the housing 31. Consequently, in the present embodiment, the intermediate oil chamber Y3 is formed in the housing 31 as depicted in FIG. 2.

As depicted in FIG. 3, the pressure-chamber large-diameter portion 533 is formed to have an outside diameter and a bore diameter increasing from the first side toward the second side. A gap 50S is formed between the pressure-chamber large-diameter portion 533 and the large-diameter portion 522. The pressure-chamber large-diameter portion 533 has a through-hole 533H penetrating the pressure-chamber large-diameter portion 533 substantially in the radial direction. The through-hole 533H communicates with the gap 50S on the first side and communicates with the intermediate oil chamber Y3 (see FIG. 2).

The bore diameter of the pressure-chamber second cylindrical portion 534 is set larger than the outside diameter of the large-diameter portion 522 of the pressing member 52. Therefore, the gap 50S is also formed between the pressure-chamber second cylindrical portion 534 and the large-diameter portion 522. The outside diameter of the pressure-chamber second cylindrical portion 534 is set equal to the bore diameter of the housing 31. In the present embodiment, in the pressure-chamber second cylindrical portion 534, the pressure chamber forming member 53 is press-fitted into the housing 31 (see FIG. 2).

The seal member 54 is attached to an outer periphery of the cylindrical portion 523 of the pressing member 52. The seal member 54 seals the gap between the pressing member 52 and the pressure chamber forming member 53.

The pressure chamber check valve 55 is a generally-disc-shaped member having a bolt hole 55H located on a central side of the pressure chamber check valve 55 in the radial direction and through which the holding bolt 391 is inserted. The pressure chamber check valve 55 is pressed against a first-side end of the channel portion 531. The pressure chamber check valve 55 opens and closes the channel 531R. The pressure chamber check valve 55 (check valve) limits a flow of oil through the channel 531R (channel portion) from an inner side to an outer side of the pressure chamber 50C, while permitting a flow of oil through the channel 531R from the outer side to the inner side of the pressure chamber 50C.

As depicted in FIG. 2, the pressure chamber check valve 55 has an orifice 55F that is a cutout extending from an outer side toward a central side of the pressure chamber check valve 55 in the radial direction. The orifice 55F enables a very small amount of oil to flow across the inside and outside of the pressure chamber 50C.

The first spring 56 contacts the pressing member 52 on the first side and contacts the shaft 58 on the second side. The first spring 56 applies, to the shaft 58, a force that causes the shaft 58 to move toward the second side.

The second spring 57 contacts the shaft 58 on the first side and contacts the nut 392 on the second side. The second spring 57 applies, to the shaft 58, a force that causes the shaft 58 to move toward the first side.

In the present embodiment, the first spring 56 (holding member) and the second spring 57 (holding member) hold the position of the shaft 58 (advancing and retracting member) with respect to the pressure chamber 50C. For example, with the shaft 58 not operated by the solenoid mechanism portion 59, a first-side tip portion of the shaft 58 is positioned at a central portion of the pressure chamber 50C in the axial direction as described below. In FIG. 2, in this state, the length of the shaft 58 to the first-side tip portion thereof with reference to a first-side tip portion of the nut 392 is equal to a distance X1.

Either one of the first spring 56 or the second spring 57 may be provided. However, in the present embodiment, the first spring 56 and the second spring 57 are provided on the first side and the second side, respectively, of the shaft 58 to stabilize movement of the shaft 58.

(Shaft 58)

As depicted in FIG. 3, the shaft 58 is a rod-like member extending in the axial direction. As described above, the first-side end of the shaft 58 is positioned inside the pressure chamber 50C. The second side of the shaft 58 is inserted into the through-hole 391H in the holding bolt 391. The shaft 58 is held in the through-hole 391H so as to be movable through the through-hole 391H in the axial direction. A second-side end of the shaft 58 is connected to the plunger 591 (see FIG. 2) described below of the solenoid mechanism portion 59.

The shaft 58 configured as described above is moved in the axial direction by the solenoid mechanism portion 59 to change the length by which the first-side end of the shaft 58 is inserted into the pressure chamber 50C. Thus, the shaft 58 (advancing and retracting member) changes the pressure of the oil in the pressure chamber 50C.

(Solenoid Mechanism Portion 59)

As depicted in FIG. 2, the solenoid mechanism portion 59 has the plunger 591, a magnetic member 592, and a coil 593. The solenoid mechanism portion 59 (driving portion) allows the shaft 58 (advancing and retracting member) to advance into and retract from the pressure chamber 50C.

The plunger 591 is a rod-like member extending in the axial direction and is supported by a bearing 591B so as to be movable in the axial direction. A first-side end of the plunger 591 is fixed to the second-side end of the shaft 58.

The magnetic member 592 is fixed to the second side of the plunger 591. The magnetic member 592 moves in the axial direction due to a magnetic field formed by the coil 593. In conjunction with the movement, the magnetic member 592 moves the plunger 591 in the axial direction.

The coil 593 generates a magnetic field by being electrified via a lead line connected to the coil 593 and not depicted in the drawings. The magnetic field generated by the coil 593 allows the magnetic member 592 to move in the axial direction. The electrification of the coil 593 is controlled, for example, by a control portion not depicted in the drawings.

<Operations of the Hydraulic Shock Absorber 1>

Figure 5:
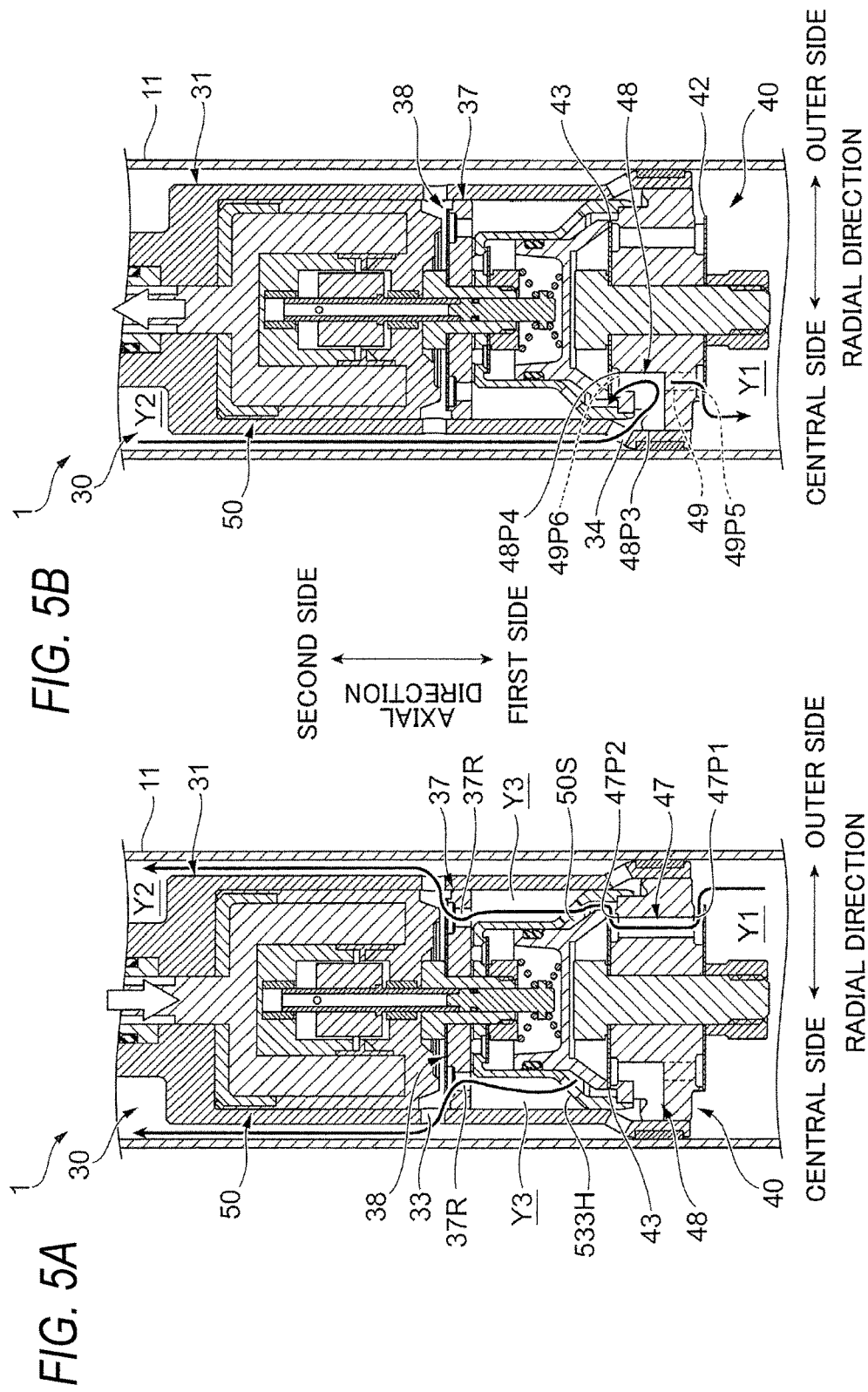
FIG. 5A and FIG. 5B are diagrams illustrating operations of the hydraulic shock absorber in the embodiment.

FIG. 5A and FIG. 5B are diagrams illustrating operations of the hydraulic shock absorber 1 in Embodiment 1. FIG. 5A is a diagram depicting a flow of oil during a compression stroke. FIG. 5B is a diagram depicting a flow of oil during an extension stroke.

First, the flow of oil during the compression stroke of the hydraulic shock absorber 1 will be destroyed.

As depicted in FIG. 5A, when the piston portion 30 moves to the first side in the axial direction with respect to the cylinder 11 as depicted by a blank arrow, the oil in the first oil chamber Y1 is pushed by the movement of the piston portion 30. Thus, the pressure in the first oil chamber Y1 increases.

The oil in the first oil chamber Y1 flows from the first oil path port 47P1 to the compression side oil path 47. Subsequently, the oil flows out into the gap 50S through the second oil path port 47P2 while opening the damping valve 43. In this manner, during the compression stroke, the oil flows through the compression side oil path 47 in the particular direction from the first side to the second side. Resistance is generated when the oil flows through the compression side oil path 47 and the damping valve 43, to allow a damping force to be exerted during the compression stroke.

The oil further flows though the gap 50S, the through-hole 533H, and the intermediate oil chamber Y3 to the channel 37R. The oil then opens the intermediate check valve 38 and flows out into the second oil chamber Y2 through the first housing oil paths 33.

As described above, in the hydraulic shock absorber 1 in the present embodiment, the piston portion 30 moves in one direction to allow the oil to flow from the first oil chamber Y1 to the second oil chamber Y2, and the flow of the oil is controlled by the compression side oil path 47 and the damping valve 43 to allow a damping force to be exerted.

As depicted in FIG. 1, in the bottom valve portion 60, the pressure of the oil in the first oil chamber Y1 is increased by movement of the piston portion 30 toward the first side in the axial direction, allowing the oil to flow through the oil holes 622R in the extension side valve 622 to the compression side oil paths 611. The oil then flows out into the reservoir chamber R while pushing the compression side valve 621.

Now, the flow of oil during an extension stroke in the hydraulic shock absorber 1 will be described.

As depicted in FIG. 5B, when the piston portion 30 moves to the second side in the axial direction with respect to the cylinder 11 as depicted by a blank arrow, the oil in the second oil chamber Y2 is pushed by the movement of the piston portion 30. Thus, the pressure in the second oil chamber Y2 increases.

Then, as depicted in FIG. 5B, the oil in the second oil chamber Y2 flows through the second housing oil paths 34 in the housing 31 and to the first extension side oil paths 48 via the third oil path ports 48P3. Subsequently, the oil flows out through the fourth oil path ports 48P4 while pushing the damping valve 43 open. As described above, during the extension stroke, the oil having flown in the direction from the second side to the first side in the axial direction is reversed in the first extension side oil paths 48 and then flows along the direction from the first side to the second side in the axial direction. That is, during the extension stroke, the oil also flows along the flow in the particular direction through the compression side oil paths 47 during the above-described compression stroke. Resistance is generated when the oil flows through the first extension side oil paths 48 and the damping valve 43, to allow a damping force to be exerted during the extension stroke.

At this time, the pressure in the intermediate oil chamber Y3 is relatively high compared to the pressure in the second oil chamber Y2, with the intermediate check valve 38 keeping the channels 37R in the check valve seat 37 closed. Therefore, the oil does not flow via the channels 37R. This allows the oil having flown out through the fourth oil path ports 48P4 to flow to the second extension side oil paths 49 through the sixth oil path ports 49P6. In the present embodiment, the second extension side oil paths 49 are provided on respective opposite sides of each of the first extension side oil paths 48 in the circumferential direction of the valve seat 41 as depicted in FIG. 4. Therefore, the oil having flown out through each of the first extension side oil paths 48 flows into the second extension side oil paths 49 provided on the respective opposite ends of the first extension side oil path 48. Then, as depicted in FIG. 5B, the oil flows out into the first oil chamber Y1 through the fifth oil path ports 49P5 while opening the check valve 42.

As described above, in the hydraulic shock absorber 1 in the present embodiment, the piston portion 30 moves in the other direction to allow the oil to flow from the second oil chamber Y2 to the first oil chamber Y1, and a damping force is exerted by controlling the flow of the oil using the first extension side oil paths 48 and the damping valve 43.

Furthermore, in the bottom valve portion 60, the piston portion 30 moves to the second side in the axial direction to reduce the pressure of the oil in the first oil chamber Y1 compared to the pressure in the reservoir chamber R as depicted in FIG. 1. As a result, the oil in the reservoir chamber R flows through the compression side oil paths 611. The oil then flows into the first oil chamber Y1 while pushing the extension side valve 622 open.

As described above, in the hydraulic shock absorber 1 in the present embodiment, the damping force is exerted during the compression stroke and during the extension stroke in response to movement of the piston portion 30 in the axial direction.

[Control that Changes a Damping Force Exerted by the Damping Unit 40]

Figure 6:
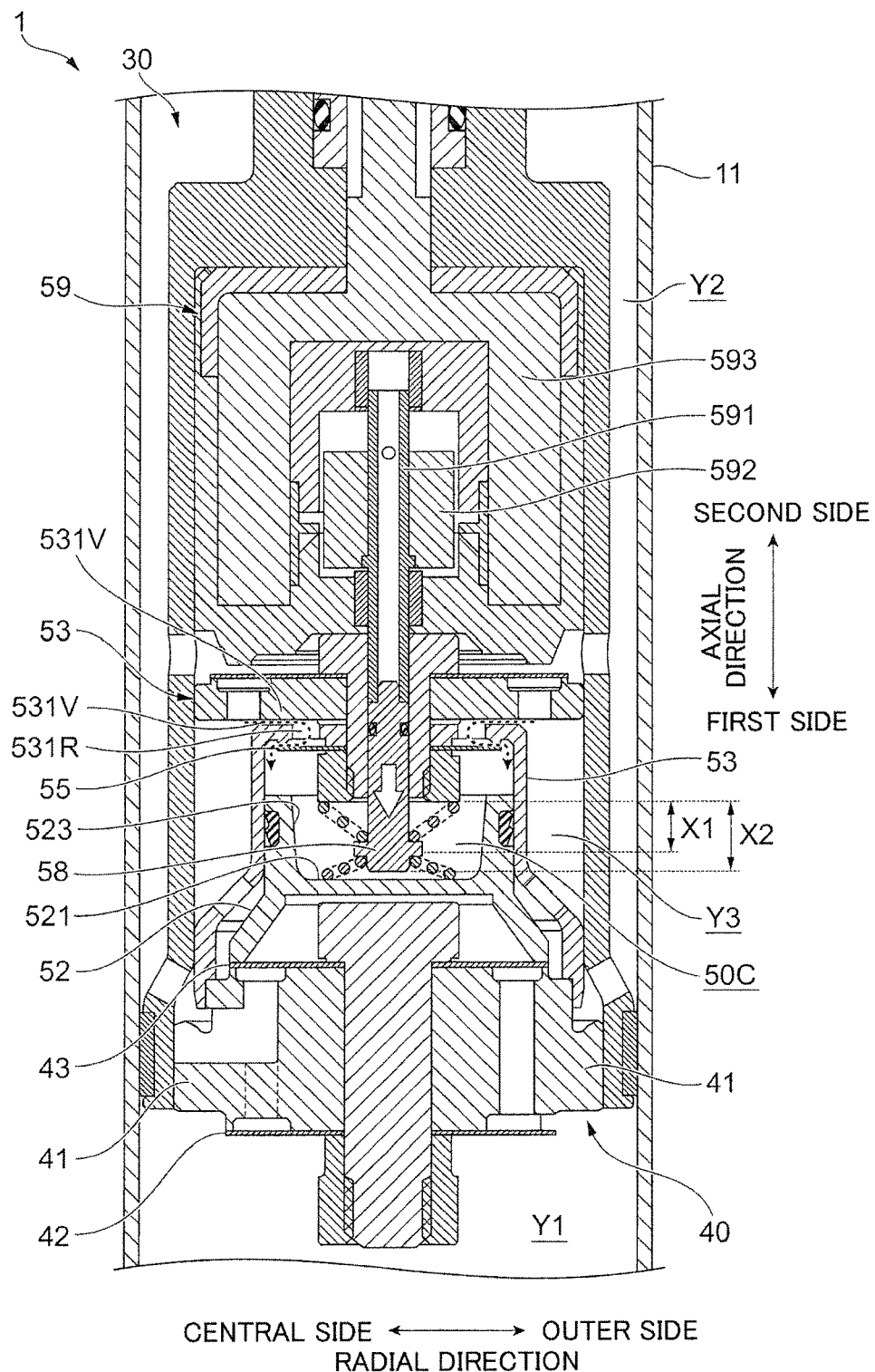
FIG. 6 is a diagram illustrating operations of the damping-force adjusting portion in Embodiment 1.

FIG. 6 is a diagram illustrating operations of the damping-force adjusting portion 50 in Embodiment 1.

Now, control will be described which is performed by the damping-force adjusting portion 50 to change a damping force exerted by the damping unit 40.

First, to increase the damping force exerted by the damping unit 40, the solenoid mechanism portion 59 is operated to move the shaft 58 in the other direction. In the example illustrated in FIG. 6, in this state, the length of the shaft 58 to the first-side tip portion thereof with reference to the first-side tip portion of the nut 392 is equal to a distance X2 (X2>X1 (see FIG. 2)). Thus, the volume of a portion of the shaft 58 that is placed in the pressure chamber 50C increases compared to the volume in a state before the shaft 58 advances into the pressure chamber 50C. As a result, the pressure of the oil in the pressure chamber 50C increases. A high pressure is applied to the pressing member 52 forming the pressure chamber 50C. A force is then increased which presses the damping valve 43 in a direction in which the pressing member 52 closes the damping valve 43. This makes the damping valve 43 unlikely to open which has controlled the flow of oil during the compression stroke and the extension stroke described above, increasing the damping force exerted by the hydraulic shock absorber 1.

As depicted in FIG. 6, the area of portions of the bottom portion 521 and the cylindrical portion 523 both formed on the second side of the pressing member 52 which portions contact the oil in the pressure chamber 50C is larger than the area of a portion of the shaft 58 that contacts the oil in the pressure chamber 50C. Therefore, the force exerted by the solenoid mechanism portion 59 to push the shaft 58 is lower than the force exerted by the pressing member 52 to press the damping valve 43. In contrast, a force higher than the force applied to the shaft 58 by the solenoid mechanism portion 59 enables the pressing member 52 to press the damping valve 43.

Thus, in the present embodiment, the solenoid mechanism portion 59 operates the shaft 58 to press the damping valve 43 via the pressure chamber 50C. Consequently, the damping valve 43 can be sufficiently pressed even using a driving source that exerts a relatively low force, for example, a solenoid.

To reduce the damping force exerted by the damping unit 40, the solenoid mechanism portion 59 is operated to move the shaft 58 in one direction. Then, the volume of the portion of the shaft 58 that is placed in the pressure chamber 50C decreases compared to the volume in a state before the shaft 58 advances into the pressure chamber 50C. As a result, the pressure of the oil in the pressure chamber 50C decreases. The force is then reduced which is exerted by the pressing member 52 to press the damping valve 43 in a direction in which the damping valve 43 is closed. This makes the damping valve 43 likely to open which has controlled the flow of oil during the compression stroke and the extension stroke described above, reducing the damping force exerted by the hydraulic shock absorber 1.

As described above, the solenoid mechanism portion 59 allows the shaft 58 to advance and retract to change the force exerted by the pressing member 52 to press the damping valve 43, thus enabling a change in the damping force exerted by the hydraulic shock absorber 1.

When driving of the shaft 58 by the solenoid mechanism portion 59 is stopped, the first spring 56 and the second spring 57 allow the shaft 58 to be returned to the original position (for example, a position at X1 (see FIG. 6)).

The oil in the pressure chamber 50C is expected to flow out from the pressure chamber 50C and to become insufficient. In such a case, the oil in the intermediate oil chamber Y3 flows into the channel 531R through the very small channel 531V in the channel portion 531. The oil in the channel 531R flows into the pressure chamber 50C while opening the pressure chamber check valve 55. As a result, the amount of the oil in the pressure chamber 50C can be recovered to the original state.

In the present invention, the example has been described where the solenoid mechanism portion 59 is used to move the shaft 58 in the axial direction. However, the present invention is not limited to the solenoid mechanism portion 59. Any other driving source may be used, for example, piezo element (piezoelectric element) the volume of which is changed when a voltage is applied to the element or a ball screw that converts rotary motion into translational motion, as long as the driving source allows the shaft 58 to move in the axial direction.

In the present embodiment, the damping unit 40 and the damping-force adjusting portion 50 are provided in the housing 31 to form a unit. In this manner, a plurality of components such as the damping unit 40 and the damping-force adjusting portion 50 is installed in the single housing 31 to allow assembly accuracy and assembly workability to be improved.

Embodiment 2

Now, the hydraulic shock absorber 1 to which Embodiment 2 is applied will be described in brief.

Figure 7:
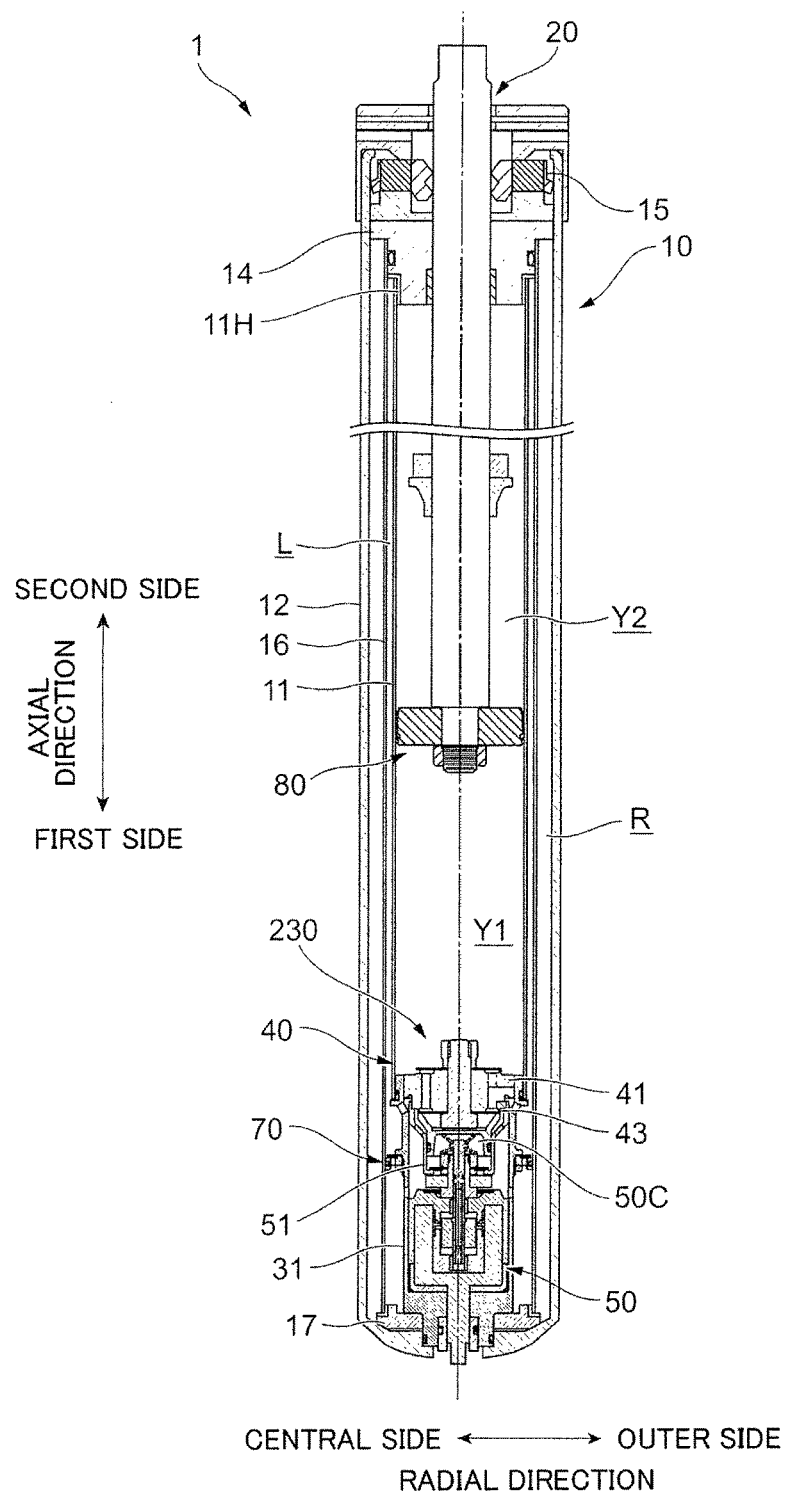
FIG. 7 is a diagram of a general configuration of a hydraulic shock absorber in Embodiment 2.

FIG. 7 is a diagram of a general configuration of the hydraulic shock absorber 1 in Embodiment 2.

Figure 8:
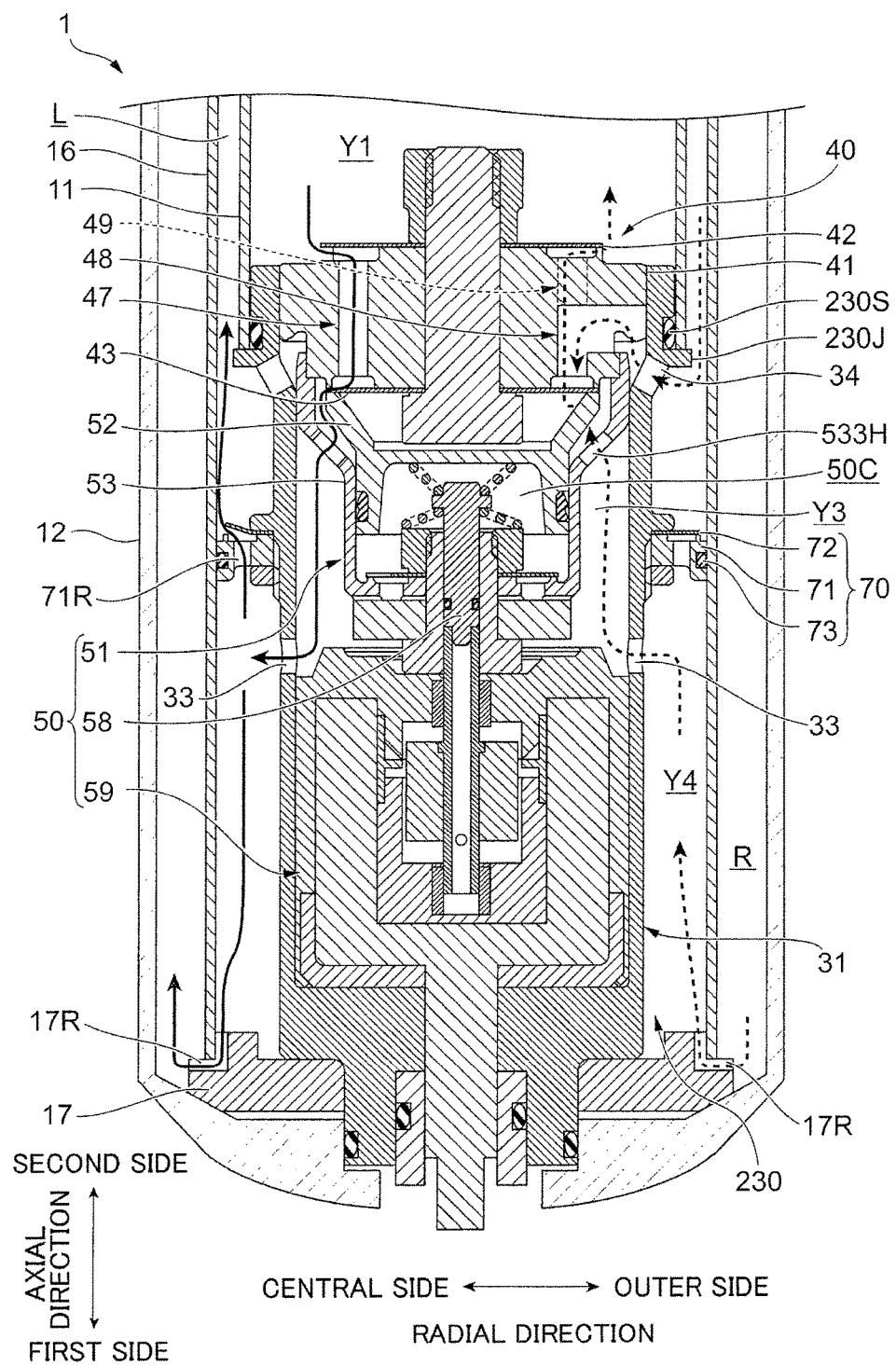
FIG. 8 is a sectional view of a bottom valve portion in Embodiment 2.

FIG. 8 is a sectional view of a bottom valve portion 230 in Embodiment 2.

Components of Embodiment 2 that are similar to the corresponding components of Embodiment 1 are denoted by the same reference numerals and will not be described in detail. Parts of the configuration of Embodiment 2 that are different from the corresponding parts of the configuration of Embodiment 1 will be described below in detail.

First, the hydraulic shock absorber 1 in Embodiment 2 will be described in brief.

As depicted in FIG. 7 and FIG. 8, the hydraulic shock absorber 1 (shock absorber) in Embodiment 2 includes the cylinder 11 (first cylinder) that houses oil (liquid), the second cylinder 12 (second cylinder) that forms, outside the cylinder 11, a reservoir chamber R (liquid reservoir chamber) in which oil is reserved, a piston portion 80 (partitioning portion) provided in the cylinder 11 so as to be movable in the axial direction and partitioning the space in the cylinder 11 into the first oil chamber Y1 (first liquid chamber) and the second oil chamber Y2 (second liquid chamber), the valve seat 41 (channel forming portion) attached to an end of the cylinder 11 to form a channel for oil flowing across the first oil chamber Y1, the second oil chamber Y2, and the reservoir chamber R in conjunction with movement of the piston portion 80, the damping valve 43 (valve) that opens and closes the channel port of the channel in the valve seat 41 to control the flow of oil through the channel, the pressure chamber 50C that houses the oil and that enables the pressure of the housed oil to be changed, and the pressing portion 51 that uses the pressure in the pressure chamber 50C to press the damping valve 43 in the direction in which the damping valve 43 closes the channel port.

These components will be described below in detail.

As depicted in FIG. 7, the hydraulic shock absorber 1 in Embodiment 2 includes the cylinder 11, the second cylinder 12 provided outside the cylinder 11, and a third cylinder 16 provided between the cylinder 11 and the second cylinder 12. The hydraulic shock absorber 1 in Embodiment 2 has a bottom piece 17 provided at an end of the third cylinder 16 and a bottom check portion 70 provided between the housing 31 and the third cylinder 16. The hydraulic shock absorber 1 in Embodiment 2 has the piston portion 80 instead of the piston portion 30 in Embodiment 1 and the bottom valve portion 230 instead of the bottom valve portion 60 in Embodiment 1.

The cylinder 11 in Embodiment 2 has a first opening 11H formed on the second side along with a groove formed in the rod guide 14. The second cylinder 12 has the reservoir chamber R that is formed outside the cylinder 11, and in the present embodiment, between the second cylinder 12 and the third cylinder 16, and in which oil is reserved. The third cylinder 16 is a thin cylindrical member. The third cylinder 16 has a communication path L that is formed outside the cylinder 11, and in the present embodiment, between the third cylinder 16 and the cylinder 11, and that forms a path for oil between the first oil chamber Y1 and the second oil chamber Y2.

As depicted in FIG. 8, the bottom piece 17 forms a fourth oil chamber Y4 along with the housing 31, the third cylinder 16, and the bottom check portion 70. The bottom piece 17 has a plurality of bottom piece oil paths 17R that bridges the fourth oil chamber Y4 and the reservoir chamber R.

The bottom check portion 70 has a check valve seat 71, a bottom check valve 72, and a seal member 73. The bottom check portion 70 is arranged between the first housing oil paths 33 and the second housing oil paths 34 in an axial direction of the bottom valve portion 230.

The check valve seat 71 has a plurality of oil paths 71R penetrating the check valve seat 71 in the axial direction.

The bottom check valve 72 is provided on the second side of the check valve seat 71. The bottom check valve 72 suppresses a flow of oil from the communication path L to the fourth oil chamber Y4, while permitting a flow of oil from the fourth oil chamber Y4 to the communication path L.

The seal member 73 is attached to an outer periphery of the check valve seat 71. The seal member 73 seals the gap between the check valve seat 71 and the third cylinder 16.

As depicted in FIG. 7, the piston portion 80 is attached to the first-side end of the rod member 21. The piston portion 80 allows oil to flow across the first oil chamber Y1 and the second oil chamber Y2 in conjunction with movement of the rod member 21 toward the first side and the second side.

As depicted in FIG. 8, the bottom valve portion 230 has the same basic configuration as that of the piston portion 30 in Embodiment 1. However, the bottom valve portion 230 has a connection portion 230J forming a point connected to the first-side end of the cylinder 11, and a seal member 230S between the housing 31 and the cylinder 11. The bottom valve portion 230 in Embodiment 2 does not include the check valve seat 37 and the intermediate check valve 38 in the intermediate-chamber forming portion 36 in Embodiment 1.

<Operations of the Hydraulic Shock Absorber 1 in Embodiment 2>

Now, a flow of oil in the hydraulic shock absorber 1 in Embodiment 2 will be described.

In the hydraulic shock absorber 1 in Embodiment 2, the piston portion 80 (see FIG. 7) moves toward the first side during the compression stroke. As depicted by a solid arrow in FIG. 8, the oil in the first oil chamber Y1 flows through the compression side oil path 47 in the bottom valve portion 230 and out into the intermediate oil chamber Y3 while opening the damping valve 43. The oil having flown into the intermediate oil chamber Y3 flows out into the fourth oil chamber Y4 through the first housing oil paths 33. The oil in the fourth oil chamber Y4 flows into the reservoir chamber R through the bottom piece oil paths 17R. The oil in the fourth oil chamber Y4 also flows into the communication path L through the oil path 71R in the bottom check portion 70. The oil having flown to the communication path L flows out into the second oil chamber Y2 (see FIG. 7) through the first opening 11H.

As described above, in the hydraulic shock absorber 1 in Embodiment 2, a damping force is exerted in the bottom valve portion 230 during the compression stroke when oil flows from the first oil chamber Y1 to the second oil chamber Y2 and the reservoir chamber R.

In the hydraulic shock absorber 1 in Embodiment 2, the piston portion 80 (see FIG. 7) moves toward the second side during the extension stroke. The oil in the second oil chamber Y2 flows into the communication path L through the first opening 11H (see FIG. 7). As depicted by a dashed arrow in FIG. 8, the oil having flown to the communication path L flows into the first extension side oil paths 48 through the second housing oil paths 34. The oil flows through the second extension side oil path 49 while opening the damping valve 43, and flows out into the first oil chamber Y1. On the other hand, the oil in the reservoir chamber R flows into the fourth oil chamber Y4 through the bottom piece oil paths 17R. The oil having flown through the fourth oil chamber Y4 flows into the intermediate oil chamber Y3 through the first housing oil paths 33. Subsequently, the oil in the intermediate oil chamber Y3 flows into the first oil chamber Y1 through the second extension side oil path 49.

As described above, in the hydraulic shock absorber 1 in Embodiment 2, a damping force is exerted in the bottom valve portion 230 during the extension stroke when the oil flows from the second oil chamber Y2 and the reservoir chamber R to the first oil chamber Y1.

Also in the hydraulic shock absorber 1 in Embodiment 2 configured as described above, the bottom valve portion 230 uses the damping-force adjusting portion 50 to adjust the pressing force that presses the damping valve 43, thus enabling a change in the damping force exerted by the hydraulic shock absorber 1.

Embodiment 3

Now, the hydraulic shock absorber 1 to which Embodiment 3 is applied will be described.

Figure 9:
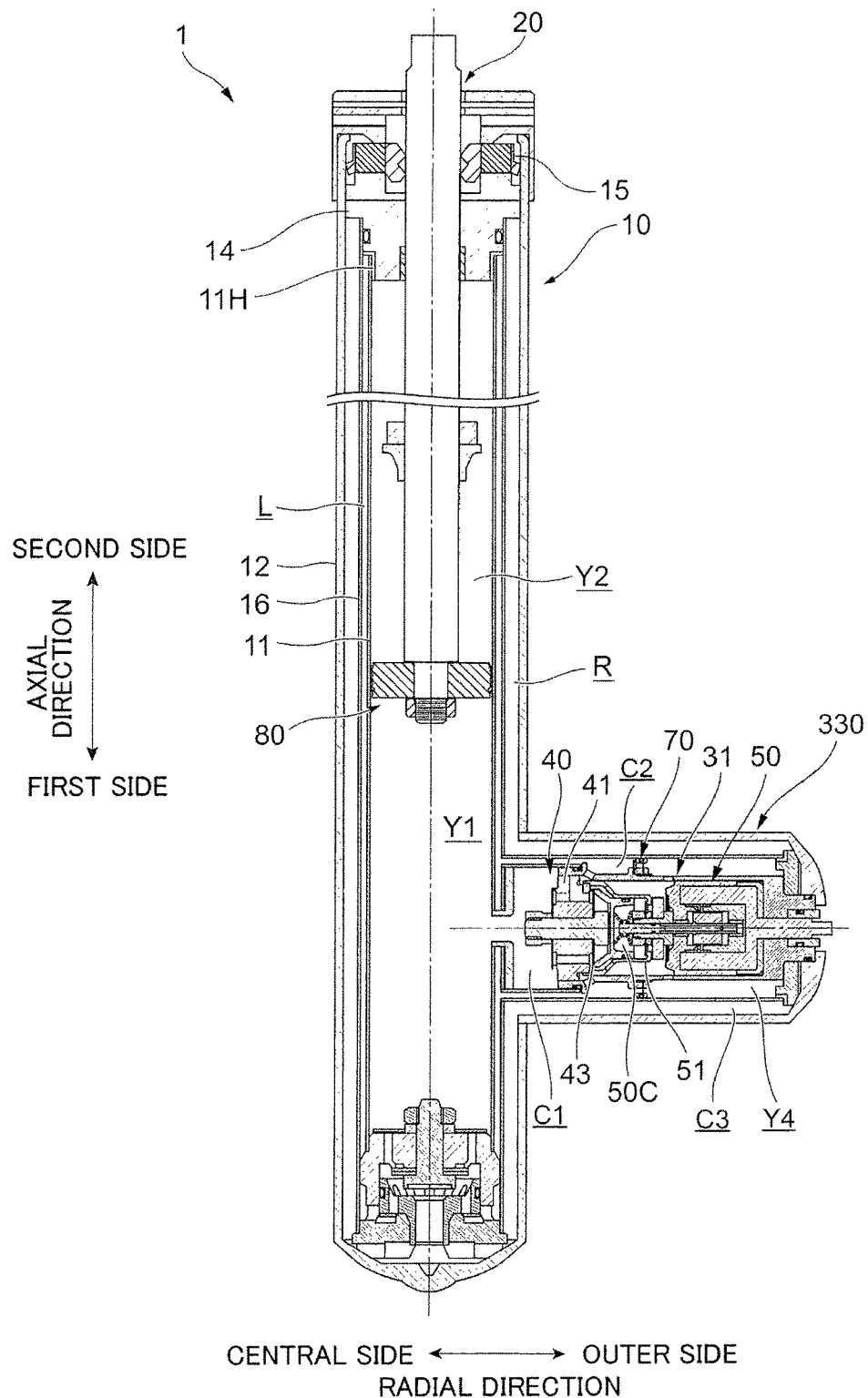
FIG. 9 is a diagram of a general configuration of a hydraulic shock absorber in Embodiment 3.

FIG. 9 is a diagram of a general configuration of the hydraulic shock absorber 1 in Embodiment 3.

Components of Embodiment 3 that are similar to the corresponding components of the above-described embodiments are denoted by the same reference numerals and will not be described in detail.

The hydraulic shock absorber 1 in Embodiment 3 has a damping-force generating portion 330. The damping-force generating portion 330 has the same basic configuration as that of the bottom valve portion 230 in Embodiment 2. The damping-force generating portion 330 has the housing 31, the damping unit 40, the damping-force adjusting portion 50, and the bottom check portion 70. The damping-force generating portion 330 extends so as to cross the axial direction of the cylinder 11, the second cylinder 12, and the third cylinder 16.

A general configuration of the hydraulic shock absorber 1 according to Embodiment 3 will be described.

As depicted in FIG. 9, the hydraulic shock absorber 1 (shock absorber) in Embodiment 1 includes the cylinder 11 that houses oil (liquid), the piston portion 80 (partitioning portion) provided in the cylinder 11 so as to be movable in the axial direction and partitioning the space in the cylinder 11 into the first oil chamber Y1 (first liquid chamber) and the second oil chamber Y2 (second liquid chamber), the valve seat 41 (channel forming portion) that forms a channel for oil flowing across the first oil chamber Y1 and the second oil chamber Y2 in conjunction with movement of the piston portion 80, the damping valve 43 (valve) that opens and closes the channel port of the channel in the valve seat 41 to control the flow of oil through the channel, the pressure chamber 50C that houses the oil and that enables the pressure of the housed oil to be changed, and the pressing portion 51 that uses the pressure in the pressure chamber 50C to press the damping valve 43 in the direction in which the damping valve 43 closes the channel port.

Specifically, as depicted in FIG. 9, the damping-force generating portion 330 has a first external oil chamber C1 formed opposite the damping-force adjusting portion 50 in the damping unit 40, a second external oil chamber C2 formed opposite the fourth oil chamber Y4 in the bottom check portion 70, and a third external oil chamber C3 formed outside the bottom check portion 70.

The first external oil chamber C1 communicates with the interior of the cylinder 11 (in the present embodiment, the first oil chamber Y1). The second external oil chamber C2 communicates with the communication path L in the present embodiment. The third external oil chamber C3 communicates with the reservoir chamber R in the present embodiment.

Also in the hydraulic shock absorber 1 in Embodiment 3 configured as described above, a damping force resulting from movement of the piston portion 80 can be changed by the damping-force generating portion 330 with the simple configuration.

Embodiment 4

Now, the hydraulic shock absorber 1 to which Embodiment 4 is applied will be described.

Figure 10:
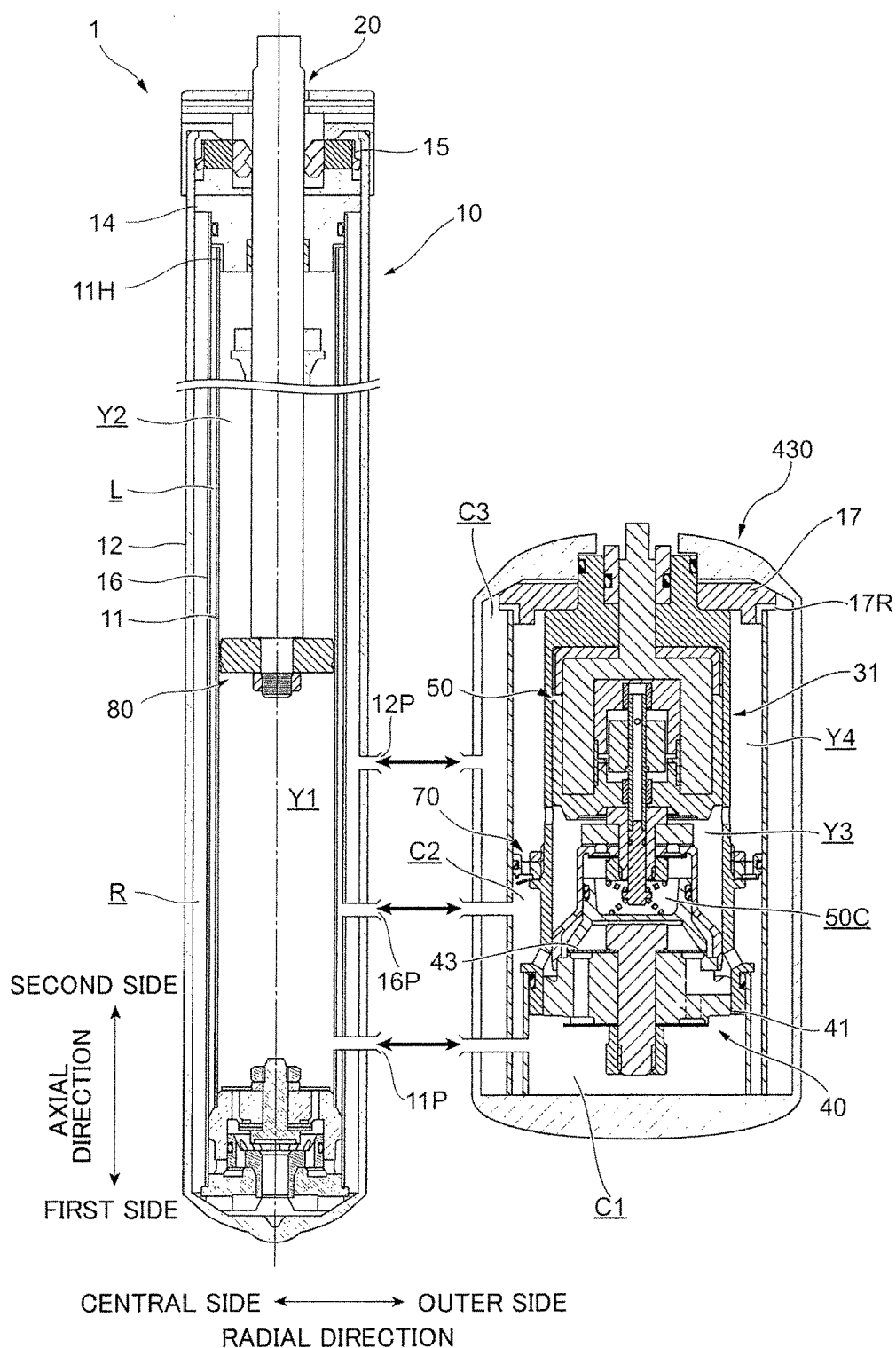
FIG. 10 is a diagram of a general configuration of a hydraulic shock absorber in Embodiment 4.

FIG. 10 is a diagram of a general configuration of the hydraulic shock absorber 1 in Embodiment 4.

Components of Embodiment 4 that are similar to the corresponding components of the above-described embodiments are denoted by the same reference numerals and will not be described in detail.

The hydraulic shock absorber 1 in Embodiment 4 has a damping-force generating portion 430. The damping-force generating portion 430 has the same basic configuration as that of the bottom valve portion 230 in Embodiment 2. The damping-force generating portion 430 has the housing 31, the damping unit 40, the damping-force adjusting portion 50, and the bottom check portion 70. The damping-force generating portion 430 is separated from the cylinder 11, the second cylinder 12, and the third cylinder 16. The damping-force generating portion 430 in the present embodiment is provided in parallel with the cylinder 11, the second cylinder 12, and the third cylinder 16.

A general configuration of the hydraulic shock absorber 1 according to Embodiment 4 will be described.

As depicted in FIG. 10, the hydraulic shock absorber 1 (shock absorber) in Embodiment 1 includes the cylinder 11 that houses oil (liquid), the piston portion 80 (partitioning portion) provided in the cylinder 11 so as to be movable in the axial direction and partitioning the space in the cylinder 11 into the first oil chamber Y1 (first liquid chamber) and the second oil chamber Y2 (second liquid chamber), the valve seat 41 (channel forming portion) that forms a channel for oil flowing across the first oil chamber Y1 and the second oil chamber Y2 in conjunction with movement of the piston portion 80, the damping valve 43 (valve) that opens and closes the channel port of the channel in the valve seat 41 to control the flow of oil through the channel, the pressure chamber 50C that houses the oil and that enables the pressure of the housed oil to be changed, and the pressing portion 51 that uses the pressure in the pressure chamber 50C to press the damping valve 43 in the direction in which the damping valve 43 closes the channel port.

Specifically, as depicted in FIG. 10, the damping-force generating portion 430 has the first external oil chamber C1 formed on the first side of the damping unit 40, the second external oil chamber C2 formed on the first side of the bottom check portion 70, and the third external oil chamber C3 formed outside the damping-force generating portion 430 in the radial direction.

The first external oil chamber C1 is connected to a communication port 11P that communicates with the interior of the cylinder 11 (in the present embodiment, the first oil chamber Y1). The second external oil chamber C2 is connected to a communication port 16P that communicates with the communication path L in the present embodiment. The third external oil chamber C3 is connected to a communication port 12P that communicates with the reservoir chamber R in the present embodiment.

Also in the hydraulic shock absorber 1 in Embodiment 4 configured as described above, a damping force resulting from movement of the piston portion 80 can be changed by the damping-force generating portion 430 with the simple configuration.

The hydraulic shock absorber 1 in Embodiment 1 has what is called a double-pipe structure. The hydraulic shock absorbers 1 in Embodiments 2 to 4 have what is called a triple-pipe structure. However, the present invention is not limited to these configurations. For example, the hydraulic shock absorber 1 in Embodiment 1 may have the triple-pipe structure, and the hydraulic shock absorbers 1 in Embodiments 2 to 4 may have the double-pipe structure. Moreover, Embodiments 1 to 4 may be applied to a single-pipe structure that is what is called a single-cylinder structure.

The bottom valve portion 60 in Embodiment 1 and the piston portion 80 in Embodiments 2 to 4 are also not limited to the structures illustrated in the above-described embodiments but may have any other shapes and configurations so long as the bottom valve portion 60 and the piston portion 8 accomplish the functions of a damping mechanism.

For the first extension side oil paths 48 provided in the valve seat 41 in Embodiments 1 to 4 to loop back the flow of oil, the shape is not limited to the one described in the embodiments, but any other shape may be used. The pressing portion 51 may be installed with only one of the first and second springs 56 and 57 installed. The first spring 56 and the second spring 57 need not necessarily be provided.

In Embodiments 1 and 2, the single damping valve 43 is used to control both the flow of oil occurring during the compression stroke and the flow of oil occurring during the extension stroke. However, the present invention is not limited to this configuration. For example, a first valve may be provided which controls the flow of oil occurring during the compression stroke, and a second valve may also be provided which controls the flow of oil occurring during the extension stroke. In this case, the above-described damping-force adjusting portion 50 may be provided in each of the first and second valves. Moreover, the damping-force adjusting portion 50 may be provided in one of the first and second valves.

What is claimed is:

1. A shock absorber comprising:
 a cylinder that houses a liquid;
 a partitioning portion that is provided in the cylinder so as to be movable in an axial direction and partitions a space in the cylinder into a first liquid chamber and a second liquid chamber;
 a channel forming portion that forms a channel for a liquid flowing across the first liquid chamber and the second liquid chamber in conjunction with movement of the partitioning portion;
 a valve that opens and closes a channel port of the channel in the channel forming portion to control a flow of the liquid through the channel;
 a pressure chamber that houses the liquid and that enables a pressure of the liquid that has been housed to be changed; and
 a pressing portion that uses a pressure in the pressure chamber to press the valve in a direction in which the valve closes the channel port, wherein the pressing portion comprises a contact member that contacts the valve and a pressure chamber forming member that forms the pressure chamber along with the contact member;
 an advancing and retracting member that advances and retracts with respect to the pressure chamber to change the pressure of the liquid in the pressure chamber, wherein the advancing and retracting member comprises a shaft and the pressure of the liquid in the pressure chamber is configured to be changed by changing a volume of a portion of the shaft that is placed in the pressure chamber.

2. The shock absorber according to claim 1, wherein a pressure receiving area of the contact member in the pressure chamber is larger than a pressure receiving area of the advancing and retracting member in the pressure chamber.

3. The shock absorber according to claim 1, further comprising a holding member that holds a position of the advancing and retracting member with respect to the pressure chamber.

4. The shock absorber according to claim 1, wherein
 the pressure chamber has a channel portion that enables the liquid to flow across the pressure chamber and an interior of the cylinder, and
 the shock absorber comprises a check valve that limits a flow of the liquid through the channel portion from an inner side of the pressure chamber to an outer side of the pressure chamber, while permitting a flow of the liquid through the channel portion from the outer side of the pressure chamber to the inner side of the pressure chamber.

5. The shock absorber according to claim 1, wherein the channel forming portion and the pressing portion are provided in the partitioning portion.

6. The shock absorber according to claim 1, wherein the channel formed by the channel forming portion comprises:
   a first channel that allows the liquid flowing from the first liquid chamber toward the second liquid chamber in conjunction with movement of the partitioning portion in one direction in the axial direction to flow in a particular direction and out through a first channel port arranged at an end of the channel forming portion; and
   a second channel that allows the liquid flowing from the second liquid chamber toward the first liquid chamber in conjunction with movement of the partitioning portion in the other direction in the axial direction to flow in the particular direction and out through a second channel port arranged at the end of the channel forming portion.

7. The shock absorber according to claim 1, further comprising a driving portion that advances and retracts the advancing and retracting member with respect to the pressure chamber.

8. The shock absorber according to claim 1, wherein the channel forming portion, the valve, the pressure chamber and the pressing portion are provided at an end of the cylinder.

9. The shock absorber according to claim 1, further comprising:
   a second cylinder that forms, outside the cylinder, a reservoir chamber in which the liquid is reserved; and
   a third cylinder that forms a channel for the liquid outside the cylinder.

10. The shock absorber according to claim 1, wherein another portion of the shaft lies outside of the pressure chamber and the shaft moves axially within the pressure chamber, thereby changing the volume of the portion of the shaft that is disposed within the pressure chamber.

* * * * *